US009244964B2

(12) United States Patent  
Bhatt et al.

(10) Patent No.: US 9,244,964 B2
(45) Date of Patent: *Jan. 26, 2016

(54) DETERMINING A CAUSE OF AN INCIDENT BASED ON TEXT ANALYTICS OF DOCUMENTS

(71) Applicant: International Business Machines Corporation, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,479

(22) Filed: May 2, 2013

(65) Prior Publication Data

US 2013/0311481 A1 Nov. 21, 2013

Related U.S. Application Data

(63) Continuation of application No. 13/476,399, filed on May 21, 2012.

(51) Int. Cl.
*G06F 17/30* (2006.01)

(52) U.S. Cl.
CPC .... *G06F 17/30321* (2013.01); *G06F 17/30336* (2013.01); *G06F 17/30424* (2013.01); *G06F 17/30613* (2013.01)

(58) Field of Classification Search
USPC ................... 707/741–746, 748, 758
See application file for complete search history.

(56) References Cited

U.S. PATENT DOCUMENTS

| 6,463,441 | B1 | 10/2002 | Paradies |
| 7,992,040 | B2 | 8/2011 | Agarwal et al. |
| 8,024,617 | B2 | 9/2011 | Kudo et al. |
| 8,065,334 | B2 | 11/2011 | Mukherjee et al. |
| 8,548,965 | B2 | 10/2013 | Devarakonda et al. |
| 2006/0106860 | A1* | 5/2006 | Dee et al. ...................... 707/102 |
| 2006/0259527 | A1 | 11/2006 | Devarakonda et al. |
| 2008/0195369 | A1 | 8/2008 | Duyanovich et al. |

(Continued)

OTHER PUBLICATIONS

Oasis, Unstructured Information Management Architecture (UIMA), May 29, 2008, Version 1.0, 11 pages, "including 2 cover sheets".*

(Continued)

*Primary Examiner* — Jean B Fleurantin
(74) *Attorney, Agent, or Firm* — Joe Poliment; Edell, Shapiro & Finnan, LLC (57) ABSTRACT

A system for determining a cause of an incident analyzes one or more change records based on text analytics using a dictionary and rules for the analysis in order to generate an index of analyzed data that represents the one or more change records. The change records each include a change and corresponding time frame for occurrence of the change. Information from a request is applied to the index of analyzed data to determine one or more candidate causes for the incident and the corresponding time frame for occurrence of the change. A time associated with the request is correlated with the corresponding time frame for occurrence of the change to identify the one or more candidate causes in the one or more change records as causes for the incident. Embodiments of the present invention further include a method and computer program product for determining causes of an incident.

21 Claims, 4 Drawing Sheets

(56) References Cited

U.S. PATENT DOCUMENTS

| | | | |
|---|---|---|---|
| 2008/0201366 A1* | 8/2008 | Devarakonda et al. ... | 707/103 Y |
| 2008/0256395 A1 | 10/2008 | Araujo et al. | |
| 2009/0112907 A1 | 4/2009 | Mukherjee et al. | |
| 2009/0150325 A1 | 6/2009 | De et al. | |
| 2009/0222395 A1* | 9/2009 | Light et al. ............ | 706/47 |
| 2009/0222441 A1* | 9/2009 | Broder et al. ............ | 707/5 |
| 2010/0050023 A1 | 2/2010 | Scarpelli et al. | |
| 2010/0287146 A1 | 11/2010 | Skelton et al. | |
| 2011/0138039 A1 | 6/2011 | Good et al. | |
| 2011/0264956 A1 | 10/2011 | Ito et al. | |
| 2011/0314138 A1 | 12/2011 | Kobayashi et al. | |
| 2011/0320874 A1 | 12/2011 | Shimada et al. | |
| 2013/0179560 A1* | 7/2013 | Kumar et al. ............ | 709/224 |

OTHER PUBLICATIONS

IBM et al., "Root Cause Analysis Support Tool by Using Text Analytics", IPCOM000189572D, Nov. 13, 2009, 1 page.

Egner et al., "UIMA GRID: Distributed Large-Scale Text Analysis", CCGRID 7th IEEE International Symposium on, May 14-17, 2007, pp. 317-326.

Lu et al., "Discovery of Root Causes of System Failures by Means of Analysis of Repair Records", Aerospace Conference on, Mar. 6-13, 2010, pp. 1-8.

"Unstructured Information Management Architecture", Sep. 17, 2007, pp. 1-2.

"IBM's Mission in Unstructured Information Management (UIM)", http://domino.researchibm.com/comm/research_projects.nsf/pages/uima.knowledgeRush.htm, retrieved from Internet Feb. 3, 2012.

"UIMA Overview & SDK Set-Up", copyrights 2004, 2006 and 2007, 4 pages, http://uima.apache.org/downloads/releaseDocs/2.2.0-incubating/docs/html/overview_and_setup/overview_and_setup.html.

* cited by examiner

DETERMINING A CAUSE OF AN INCIDENT BASED ON TEXT ANALYTICS OF DOCUMENTS

CROSS REFERENCE TO RELATED APPLICATIONS

The present application claims priority to U.S. Nonprovisional application Ser. No. 13/476,399, filed 21 May 2012 and entitled "Determining a Cause of An Incident Based on Text Analytics of Documents," the disclosure of which is incorporated herein by reference in its entirety.

BACKGROUND

1. Technical Field

Present invention embodiments relate to document analysis, and more specifically, to determining root causes of a problem or incident based on text analytics of a document indicating occurrence of a change.

2. Discussion of the Related Art

Many issues reported by customers of a company are due to an event or change that was initiated by the company. For example, a raw material or supplier may have changed, the manufacturing processing line may have been modified, or a piece of equipment replaced. Most of the time, a customer service representative takes a call, records the issue, and tries to solve the problem. Typically, the reported problems are difficult to trace to a root cause due to a time lapse, a lack of experience or knowledge by the representative, and record keeping. For instance, if there is a problem that occurs due to a change in processing, an experienced employee may be aware of an existing or known event that could cause the issue. However, a new employee may not have the same knowledge and, thus, is unable to determine the root cause. Knowing the root cause of a problem when a problem or incident occurs enables a company to make informed decisions and take appropriate action more quickly, thereby reducing customer service and warranty costs.

Traditional approaches to solving customer service or warranty issues rely on analysis of historical warranty claims data. Other methods rely on customer service checklists to lead a customer through a series of questions in order to determine a root cause. These traditional methods tend to introduce unnecessary latency into the root cause determination or provide troubleshooting on a one-by-one basis.

BRIEF SUMMARY

According to one embodiment of the present invention, a system for determining a cause of an incident analyzes one or more change records based on text analytics using a dictionary and rules for the analysis in order to generate an index of analyzed data that represents the one or more change records. The change records each include a change and corresponding time frame for occurrence of the change. Information from a request is applied to the index of analyzed data to determine one or more candidate causes for the incident and the corresponding time frame for occurrence of the change. A time associated with the request is correlated with the corresponding time frame for occurrence of the change to identify the one or more candidate causes in the one or more change records as causes for the incident. Embodiments of the present invention further include a method and computer program product for determining a cause of an incident in substantially the same manner described above.

DETAILED DESCRIPTION

Present invention embodiments determine the root cause or causes of a problem or incident (e.g., a manufacturing defect or a customer service problem, etc.) by analyzing available documentation. When a new problem occurs, a user may enter a search query into a user interface to a software application that acts as a front end for a database engine. The application will run the necessary searches and return the results to the user along with a correlation score. The correlation score may be a raw correlation value (e.g., from 0 to 1), a scaled correlation value (e.g., from 0 to 100), or a relative correlation value (e.g., low, medium, or high). For example, ice cream may be melting prematurely during shipment and the first problems may have been reported starting a month ago. The user may enter a query into the application such as "ice cream is melting during shipping" and the date of the first problem report. The application will search a database and return a causation report that contains a potential cause and a correlation score. The causation report may indicate that ice cream individual packaging was changed two months ago with a "medium" correlation score, and that the 150 unit bulk ice cream shipping containers were changed last month with a "high" correlation score. The bulk packaging change may be given the higher score because the corresponding change is closer to when the actual problems started being reported (e.g., starting a month ago, etc.).

Present invention embodiments employ text analytics for text analysis of documents in order to generate a database index that may be searched to find a root cause of an incident. Initially, an events and causes dictionary (or database) is developed. The dictionary contains a list of events and possible causes that may occur in a given time frame. For instance, if ice cream packaging is changed, issues may occur (e.g., with ice cream leaking or melting, packages damaged, etc.) within 3 weeks or up to 3 months (e.g., since it takes 3 weeks to distribute ice cream from the factory to the store shelf and ice cream usually expires 3 months from the production date). Thus, dictionary entries may be in the form of a noun, verb, and list of causes. For example, the noun could be "package", the verb could be "changed" or "replaced" and the causes may be any result that may occur when a package is changed (e.g., "leaking," "melting," "premature spoilage", etc.)

Documents that indicate actual changes are analyzed using text analytics to generate a database index. These documents (referred to herein as change list records) may be in the form of formal change logs, emails, or any other documents that can be analyzed using the events and causes dictionary.

Change list records are company records that list the actual changes and the dates that these changes were implemented, and may be in the form of structured or unstructured data. For example, if a company introduces new flavor of ice cream or changes packaging material, the records contain details on these changes. The change list may include the event, the date of change, and any other notes made by company employees. A query is received and applied against the database index to ascertain a root cause of an incident.

Figure 1:
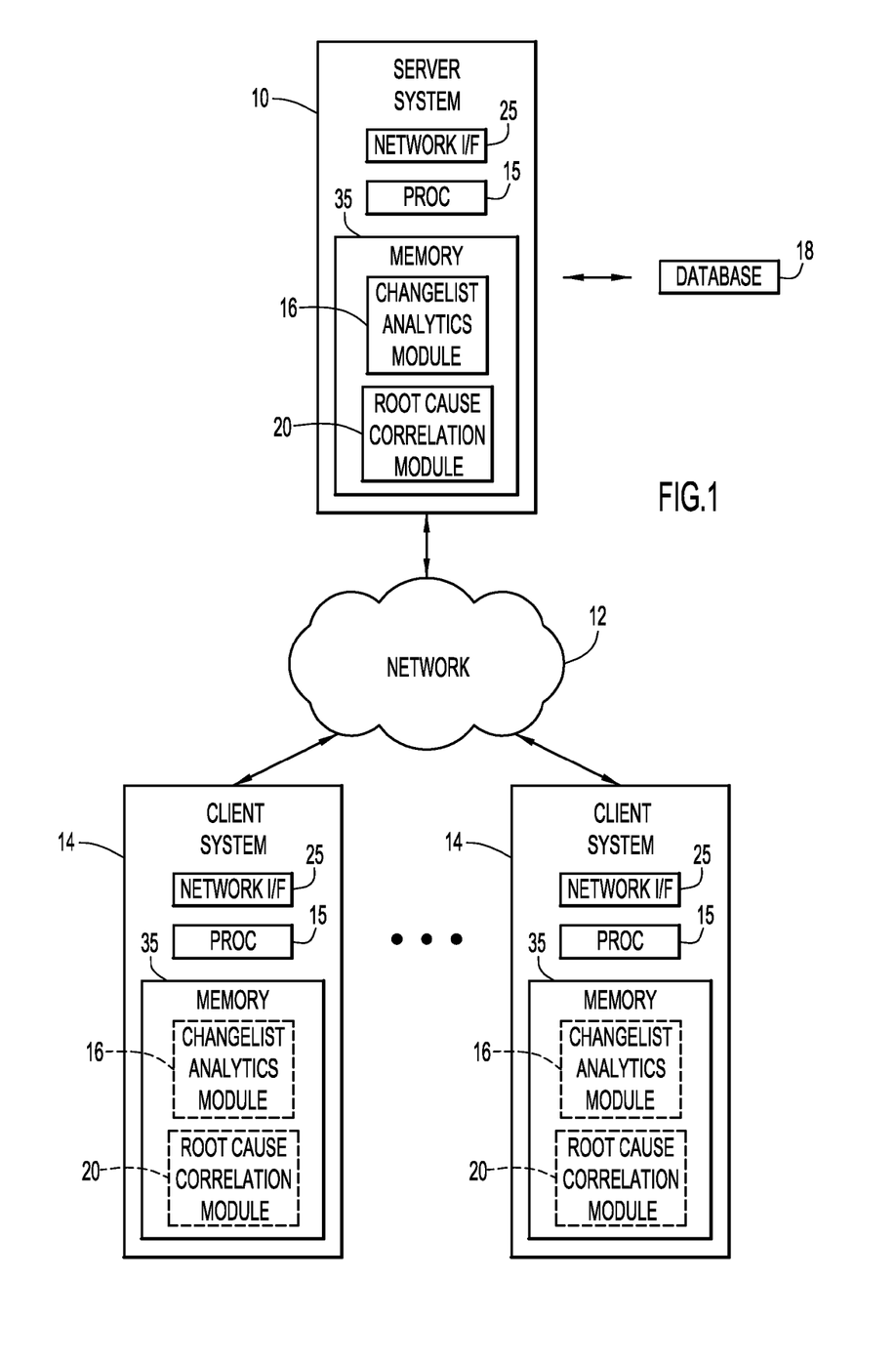
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.)

Client systems 14 enable users to provide information and queries related to incidents (e.g., documents for document collections, documents for analysis to determine root cause information, etc.) to server systems 10 to determine root cause information pertaining to changes at a company or other entity. In another example, the information and queries may be provided directly to the server. The server systems include a changelist analytics module 16 to generate an index of analyzed data (e.g., a root cause database index), and a root cause correlation module 20 to analyze the root cause database index based on a user query. A database system 18 may store various information for the analysis (e.g., generated root cause databases and indexes, sample collections of documents, search results and correlation scores, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the problem for analysis, and may provide reports including analysis results (e.g., text analytics, root causes, correlation scores, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, changelist analytics module, root cause correlation module, browser/interface software, etc.).

Alternatively, one or more client systems 14 may perform root cause analysis when operating as a stand-alone unit. In a stand-alone mode of operation, the client system stores or has access to the data (e.g., root causes, correlation scores, sample collections of documents, etc.), and includes changelist analytics module 16 and root cause correlation module 20 to perform the root cause analysis on documents. The graphical user (e.g., GUI, etc.) or other interface (e.g., command line prompts, menu screens, etc.) solicits information from a corresponding user pertaining to root cause analysis, and may provide reports including analysis results (e.g., text analytics, root causes, correlation scores, etc.).

Changelist analytics module 16 and root cause correlation module 20 may include one or more modules or units to perform the various functions of present invention embodiments described below. The various modules (e.g., changelist analytics module, root cause correlation module, etc.) may be implemented by any combination of any quantity of software and/or hardware modules or units, and may reside within memory 35 of the server and/or client systems for execution by processor 15.

Figure 2:
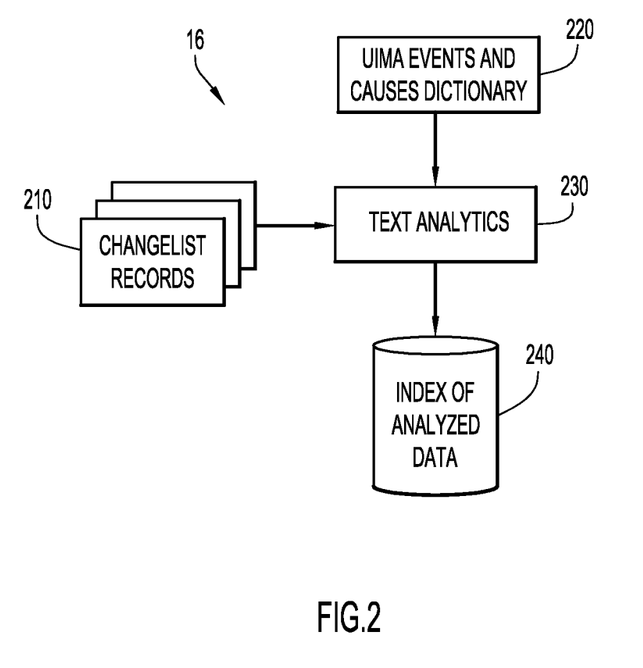
FIG. 2 is a diagrammatic illustration of an example module that generates a root cause database index from sample documents according to an embodiment of the present invention.

An example block diagram of changelist analytics module 16 to generate potential root cause data from sample documents (e.g., via server system 10 and/or client system 14) according to an embodiment of the present invention is illustrated in FIG. 2. Changelist analytics module 16 receives changelist records 210 and events and causes dictionary 220. Initially, events and causes dictionary 220 is developed based on information from the company or other entity, and may be stored within database system 18. By way of example, the dictionary is developed using an Unstructured Information Management Architecture (UIMA) (e.g., the Apache UIMA which is maintained by the Apache Software Foundation and is an open source software platform). UIMA is designed to provide a framework and common foundation for discovering knowledge that is present in a wide variety of information sources (e.g., web pages, emails, journal articles, etc.). The various techniques and modules described herein may be developed within the UIMA framework (e.g., analytics module 16 and root cause correlation module 20 may be implemented as one or more UIMA applications that use database system 18 for storage and retrieval). It should be understood that any text analytic technologies similar to UIMA may be employed to accomplish the techniques described herein. For example, other off-the-shelf analytics applications or custom software and/or hardware may be used instead of, or in addition to, UIMA.

Unstructured data contained in text documents (e.g., reports, emails, web pages, etc.) contain valuable information which is often missed in standard text analysis. Most of the data in an enterprise, intelligence, and other information driven environments is of an unstructured nature. This data can be used effectively and efficiently by creating some form of structured view of the documents (e.g., for advanced searching or data mining). Unstructured information management (UIM) applications extract concepts of interest, relations between them, or facts.

Accordingly, dictionary 220 is developed to contain items of interest to be mined from the underlying data (e.g., a list of events or incidents and possible causes in a given time frame). The dictionary entries may be in the form of a noun, verb, list of causes, and a causation time frame. The dictionary may also contain other data such as parts of speech (e.g., adjectives, adverbs, etc.), phrases, etc. By way of example, ice cream packaging may be changed, and an issue may arise (e.g., ice cream leaking or melting, packages damaged, etc.) within 3 weeks or up to 3 months (e.g., since it takes 3 weeks to distribute ice cream from the factory to the store shelf and ice cream usually expires 3 months from the production date). Accordingly, a corresponding dictionary entry may include a noun of "package", a verb of "changed" or "replaced", and causes that may be any result that may occur when a package is changed (e.g., "leaking," "melting," and "premature spoilage", etc.) The associated causation time frame may be "3 months from the manufacturing date."

The dictionary may also contain more complex grammar-like constructs. For example, the dictionary may contain noun alternatives and plurals, verb conjugations, and conjunctions or other Boolean terms (e.g., not, or, and, and exclusive-or). For example, the noun may be "package" and the alternatives are "packages," "container," and "containers," where there is an implied "or" construct when alternatives are provided. Thus, the noun may be "package", "packages", "container", or "containers". The primary verb may be "leak" with conjugations of "leaks," "leaked," and "leaking," or "change," with conjugations of "changed" or "changing." Note that the verb "leak" was mentioned above with regard to causation. Thus, verbs may be used both for a changelist and for causation, as will be explained below.

Furthermore, other more complex constructs may be used. For example, changes may be "package replaced but not changed" or "container upgraded and supplier replaced and container materials not changed", while incidents or events may be "package leaking and not rupturing" or "container subject to damage." As can be seen from the few examples presented that a wide variety of grammatical constructions may be used within the dictionary. These grammatical constructions can be combined to form rules. An example data rule entry is shown in Table 1 below:

TABLE 1

Example event and causes rule entries for an ice cream product

| Rule # | If (noun) | Con-nector | Verb (event) | Con-nector | Then (cause) | Time frame |
|---|---|---|---|---|---|---|
| 1 | Package Container | or | Changed | None | Leak Melt Spoil | Within 3 months of test date |
| 2 | Filling machine | None | Replaced Repaired | but not | Spoil | Within 3 months of test date |

In this example, rules in the table utilize one or more dictionaries that have features for events, causes, and timeframes. Rule #1 indicates that if an ice cream package or container is changed, a correlation with the change may result in leaking, melting, or spoilage when the result occurs within three months of the test date (e.g., the manufacturing date). Rule #2 indicates a condition where an ice cream filling machine has been replaced but not repaired and that may result in spoilage within the specified time frame of three months of the test date. Accordingly, the dictionary when applied to source changelist documents can be used to generate a database of analyzed changes within a company or other entity.

Changelist records 210 (e.g., emails, reports, formal change records, internal documents, etc.) are received. The changelist records are analyzed by text analytics module 230 (e.g., via a server system 10 and/or client system 14) using events and causes dictionary 220. The text from changelist records 210 is extracted and parsed, and pattern matching is performed based on the events and causes (UIMA) dictionary. Text analytics module 230 may use text analysis engines (TAE) (also referred to as analysis engines or annotators) that implement the actual analysis algorithms. Annotators create annotations that include meta-data information associated with a particular location or span in the original unstructured data or document. Examples of annotations that may be applied to text documents include annotations that identify sequences of characters as an entity name, a telephone number, flavor of ice cream, product size, product serial number, etc. The text analysis engines (TAE) may be designed to interpret and account for common spelling errors, grammatical mistakes, and punctuation. In addition, advanced text analysis engine (TAE) functions may include identification of relationships between items or major topics discussed in the text.

The text analytics produce a data structure (that may be referred to as a Common Analysis Structure (CAS)) in which all the information belonging to a document is logically bundled. Essentially, the Common Analysis Structure (CAS) is an in-memory representation of the document and includes content and metadata information in the form of annotations. The Common Analysis Structure (CAS) is supplied by a sequence of annotators that each add meta-data based on the annotator logic. Subsequent annotators can build on the results from prior annotators in a flow. Plural Common Analysis Structures (CAS) are stored as an index 240 that is available for semantic searches as described below. The index may be stored as Extensible Markup Language (XML) tags that correspond to the structure of the original changelist record, or as data pointers into a document (e.g., a relative data address, a paragraph number, line number, character position, etc.). Accordingly, the index in one example may be a record that contains a change, a change date, potential defect with a corresponding cause, and a tag or pointer to the relevant portion of the source document. Thus, the index forms an abbreviated representation of the source document and date based metadata in searchable form and based on events and causes dictionary 220.

Discovered analysis results represented in the Common Analysis Structure (CAS) can be used in data mining applications or to implement advanced search capabilities in search engines as described below. The flow of changelist records through a UIMA pipeline may be analyzed by plural Text Analysis Engines (TAE) that aggregate multiple annotators. Thus, the index is a basic UIMA component that receives the Common Analysis Structures (CAS) after all Text Analysis Engines (TAE) in a flow have completed processing.

Changelist analytics module 16 provides a text analysis platform that acquires and transforms the changelist records, performs basic linguistic processing (including language determination and tokenization), and stores the analyzed documents and extracted information in a search index for semantic search. The analyzed documents and extracted information may further be stored in a relational database for data mining on the discovered information.

Figure 3:
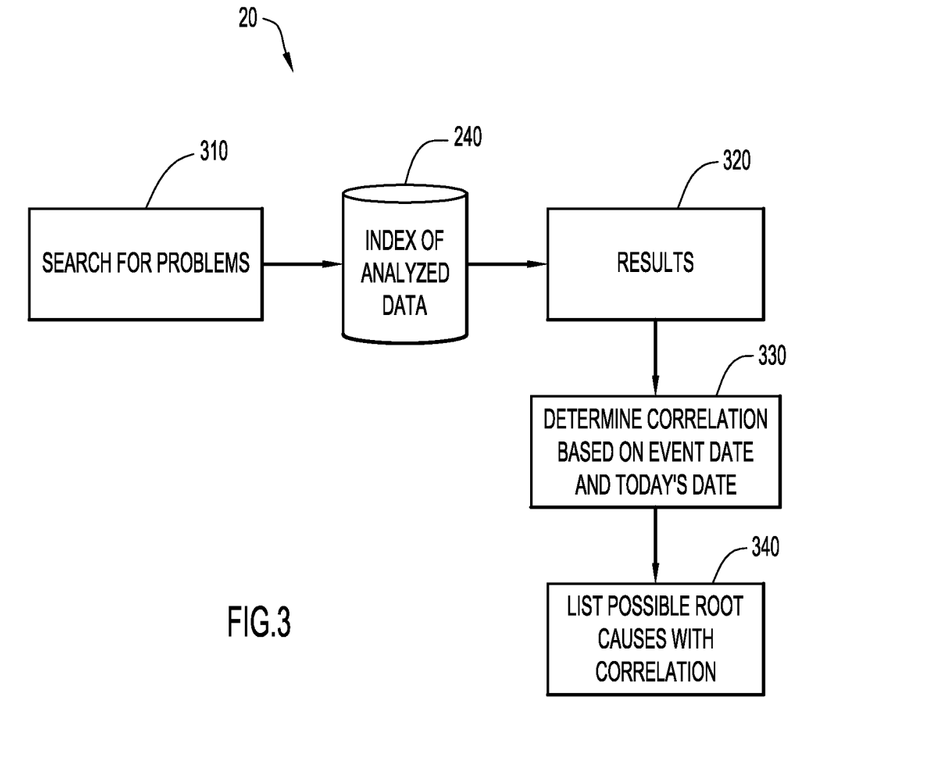
FIG. 3 is a diagrammatic illustration of an example module that analyzes a root cause database index and correlates an incident with a root cause of that incident according to an embodiment of the present invention.

An example block diagram of root cause correlation module 20 to use an index of analyzed changelist records and generate a list of root causes and their corresponding correlation score (e.g., via a server system 10 and/or client system 14) according to an embodiment of the present invention is illustrated in FIG. 3. Initially, a user entered query is received at block 310. The query may be entered via a user interface or may be selected from a list of "canned" or predesigned queries. In this regard, the user may opt to store any given query for future use. For example, the user may enter the product, associated product information (e.g., serial number, model, etc.), date manufactured, date shipped, defect date, and the defect. By way of example with respect to ice cream, the query may include a product of ice cream, a size of 1.5 quarts, a flavor of vanilla, a ship date of three weeks ago, a defect of package leaking, and a defect date of within the last week.

Once the query is received, root cause correlation module 20 searches index 240 using text analytics as described above. Alternatively, the search may be conducted via standard database search techniques or within the UIMA framework. Any matches to the received search query are returned and stored at block 320. The search results may further contain information from the annotations that enable the user to retrieve the original source documents to obtain additional information about the changes that are part of the corresponding changelist record.

Root cause correlation module 20 determines a correlation value or score based on a test date (e.g., the event or incident date, a current date, etc.) at block 330. The correlation may be based on a test date in comparison to time frames associated with events or incidents stored in dictionary 220 and annotated in index 240. In some instances, the problem may not have come to the attention of the appropriate personnel. Thus, the current date may not be appropriate for analysis, and the problem report date or event date is used for comparison. For example, if a company receives a complaint about ice cream melting four weeks after the packaging was changed, there is a high correlation of this event or complaint with a package change event. However, if the company receives the same complaint a year after the packaging was changed, the correlation value is low since the complaint is received outside of an expected time frame.

When a correlation exists, root cause correlation module 20 returns a list of possible or potential root causes and their corresponding correlation score at block 340. The correlation score may be a raw correlation value (e.g., from 0 to 1), a scaled correlation value (e.g., from 0 to 100), a relative correlation value (e.g., low, medium, or high). An example algorithm for determining a correlation score can be found in the pseudo-code in Listing 1, below:

Listing 1 Example correlation score pseudo-code

```
if (within_specified_timeframe) then
    if (search_match = 80% to 100%) then {correlation_score = 1.0};
    else if (search_match = 60% up to 80%) then {correlation_score = 0.9};
    else if (search_match = 40% up to 60%) then {correlation_score = 0.8};
    else if (search_match = 20% up to 40%) then {correlation_score = 0.7};
    else if (search_match = 0% up to 20%)  then {correlation_score = 0.6};
else if (not_within_specified_timeframe) then
    if (search_match = 80% to 100%) then {correlation_score = 0.5};
    else if (search_match = 60% up to 80%) then {correlation_score = 0.4};
    else if (search_match = 40% up to 60%) then {correlation_score = 0.3};
    else if (search_match = 20% up to 40%) then {correlation_score = 0.2};
    else if (search_match = 1% up to 20%)  then {correlation_score = 0.1};
    else {correlation_score = 0.0};
```

The above algorithm is one way of determining a correlation value. The statistical calculation of the correlation value will be based on the timeframe of the event and how closely the request matches the changelist events (e.g., lemma match, synonyms, etc.). The example in Listing 1 uses a search_match condition, a within_specified_timeframe condition, and a not_within_specified_timeframe condition. The search_match condition indicates the percentage of search criteria that match. The search criteria use exact matching, phrase matching, partial matching, negative matching, etc., or use matches that are not exact (e.g., due to spelling or grammar errors that are not accounted for in the dictionary).

The algorithm in Listing 1 sets the correlation score based on the percentage of search criteria that match and the date of the query being within a specified timeframe (e.g., a correlation score of 1.0 for a search match of 80%-100%; a correlation score of 0.9 for a search match of 60%-80%; a correlation score of 0.8 for a search match of 40%-60%; a correlation score of 0.7 for a search match of 20%-40%; and a correlation score of 0.6 for a search match of 0%-20%). If the date of the query is not a specified timeframe, the correlation score is set to lower values (e.g., a correlation score of 0.5 for a search match of 80%-100%; a correlation score of 0.4 for a search match of 60%-80%; a correlation score of 0.3 for a search match of 40%-60%; a correlation score of 0.2 for a search match of 20%-40%; and a correlation score of 0.1 for a search match of 1%-20%). Otherwise, the correlation score is set to zero.

The algorithm in Listing 1 can be used to generate a correlation report based on a query. An example correlation report is shown in Table 1 below:

TABLE 2

Example query results

| Query summary | Result number | Result | Correlation Score | Source changelist document location |
|---|---|---|---|---|
| Ice cream, 1.5 quart, melting | 1 | Packaging change five week ago | 0.9 (high) | S:/documents/change records/daily report 123.doc |
|  | 2 | Manufacturing equipment change six months ago | 0.1 (very low) | S:/documents/change records/plant log 234.doc |

The results shown in Table 2 indicate that the most likely (correlation score of 0.9) cause of ice cream melting is a packaging change that occurred five weeks ago. Result number 2 provides a correlation score of 0.1, and indicates that the manufacturing equipment change that occurred six months ago may have an effect on causing ice cream packages to leak, but that effect is unlikely.

Any of the source documents (changelist records 210), UIMA dictionary 220, index 240, search results of block 320, correlation scores and root cause lists of block 340 may be stored within database system 18, or locally on the server and/or client system performing the analysis. Once the results (e.g., root causes and corresponding correlation scores) are determined, the results may be compared and appropriate corrective action may be performed within the company (e.g., revert to previous packaging composition or manufacturer, product formulation, equipment, etc., or provide further changes or corrections to the previously modified manufacturing line).

Figure 4:
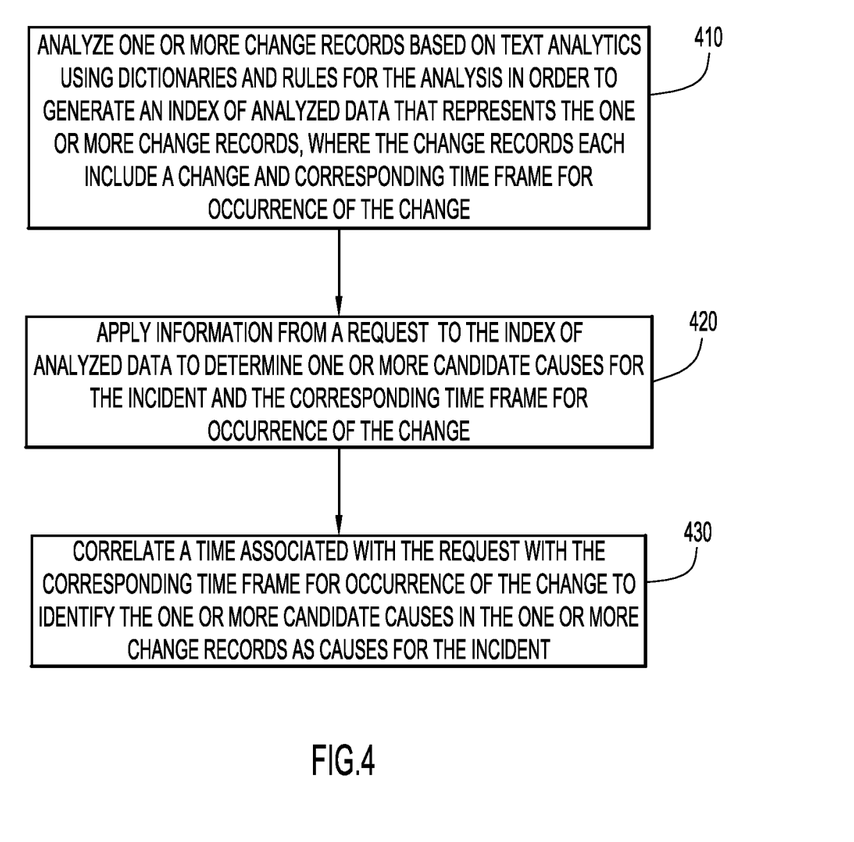
FIG. 4 is a procedural flow chart illustrating a manner in which an incident query is analyzed and correlated with root causes of the incident according to an embodiment of the present invention.

A manner in which changelist analytics module 16 and root cause correlation module 20 (e.g., via a server system 10 and/or client system 14) analyzes changelists and a request (query) to provide root causes and correlation scores according to an embodiment of the present invention is illustrated in FIG. 4. Specifically, one or more change records associated with candidate causes are analyzed based on text analytics using dictionaries and rules for the analysis in order to generate an index of analyzed data that represents the one or more change records at step 410. The change records each include a change and corresponding time frame for occurrence of the change. Information from a request or query is applied to the index of analyzed data to determine one or more candidate causes for the incident and the corresponding time frame for occurrence of the change at step 420. A time associated with the request is correlated with the corresponding time frame for occurrence of the change to identify the one or more candidate causes in the one or more change records as causes for the incident at step 430.

Techniques further include provision where the text analytics includes dictionaries based on the UIMA architecture and may include rules and an index of analyzed data that are also based on the UIMA architecture. An off-the-shelf text analytics suite or a custom text analytics suite may be employed instead of, or in addition to, UIMA. A correlating score may be computed and the one or more candidate causes with a highest correlation score is identified as a most likely cause for the incident. Further, correlating may include a time associated with the request comprising a time of the incident, a current time, or a date entered by a requester.

The index of analyzed data may include annotations referencing the one or more change records, extensible markup language (XML) representations of the one or more change records, and/or metadata configured to provide additional change record information of applying information from the request.

It will be appreciated that the embodiments described above and illustrated in the drawings represent only a few of the many ways of implementing embodiments for determining a cause of an incident based on text analytics of documents.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, changelist analytics module, root cause correlation module, etc.). These systems may include any types of monitors and input devices (e.g., keyboard, mouse, voice recognition, etc.) to enter and/or view information.

It is to be understood that the software (e.g., changelist analytics module, root cause correlation module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., changelist analytics module, root cause correlation module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., documents, document collections, root cause lists, and correlation scores, annotations, analyzed data, etc.). The database system may be implemented by any number of any conventional or other databases, data stores or storage structures (e.g., files, databases, data structures, data or other repositories, etc.) to store information (e.g., documents, document collections, root cause lists, and correlation scores, etc.). The database system may be included within or coupled to the server and/or client systems. The database systems and/or storage structures may be remote from or local to the computer or other processing systems, and may store any desired data (e.g., documents, document collections, root cause lists, and correlation scores, etc.). Further, the various tables (e.g., root cause lists, and correlation scores, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for determining any desired potential cause information (e.g., changes, modifications, replacements, any combinations thereof, etc.) from any type of document (e.g., speech transcript, web or other pages, word processing files, spreadsheet files, presentation files, electronic mail, multimedia, etc.) containing text in any written language (e.g. English, Spanish, French, Japanese, etc.). The potential cause information may pertain to any type of company or entity operations (e.g., manufacturing, internal processes and workflows, hardware and software product development, etc.).

The correlation scores may be determined in any fashion, and include any desired value within any desired value range. For example, the correlation score may be the actual date difference, or convert an actual date difference to any desired value range (e.g., 0-100, 0-10, 0-1, etc.) via any conventional or other techniques (e.g., normalization, look-up table, mathematical formula or operation, etc.). Any quantity of analysis techniques may be applied to documents to generate the index of analyzed data and root cause reports. The analysis techniques may measure any desired quantity of characteristics, where the measurements may be combined in any fashion to produce the correlation score (e.g., average or weighted average, summation, etc.). Any quantity of causes and correlation scores may be compared to produce a most likely causal match.

The dictionaries may be developed in any manner (e.g., manually developed, based on a template, etc.) and contain any type of data (names, nouns, verbs, numbers, etc.) and/or rules (e.g., grammatical, lexical, or mathematical constructs). The dictionaries may be designed in any manner that facilitates tagging or document analysis by an analysis engine or annotator. The dictionary may be in any format (e.g., plain text, relational database tables, nested XML code, etc.). Any number of dictionaries may be used for analysis.

Text analytics may be performed using any manner of text analysis (e.g., linguistic, semantic, statistical, machine learning, natural language processing, etc.). Text analytics may use any form of information retrieval and lexical analysis to analyze word frequency distributions, and perform pattern recognition, tagging, annotation, information extraction, and/or data mining. Text analysis techniques may include link and association analysis, visualization, and predictive analytics.

The present invention embodiments may employ any number of any type of user interface (e.g., Graphical User Interface (GUI), command-line, prompt, etc.) for obtaining or providing information (e.g., documents, document collections, root causes, queries, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, correlation scores, root cause information pertaining to the entered query, etc.).

The present invention embodiments are not limited to the specific tasks or algorithms described above, but may be utilized for determining root cause or other information (with identifiable characteristics) for any types of documents.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of determining a root cause of an incident, said method comprising:
   analyzing, via a processor, one or more change records based on text analytics using a dictionary and rules for the analysis in order to generate an index of analyzed data that represents the one or more change records in an abbreviated representation for searching, wherein the indent pertains to a defect with a manufactured product provided by an entity, and wherein the change records each include a change implemented to operations that produce the manufactured product provided by the entity and a corresponding time frame for occurrence of the change;
   searching, via a processor, the index of analyzed data by applying information from a request for the root cause of the incident to the index of analyzed data to determine one or more change records from the abbreviated representation listing changes serving as one or more candidate causes for the incident, wherein applying the information includes:
     correlating the request with the changes listed by the one or more change records based on a time associated with the request being within a specified time interval of the corresponding time frame of occurrence of the changes listed by the one or more change records, and
     identifying the one or more candidate causes in the one or more change records as causes for the incident based on the correlation.

2. The method of claim 1, wherein the text analytics include dictionaries based on one of an Unstructured Information Management Architecture (UIMA), an off-the-shelf text analytics suite, and a custom text analytics suite.

3. The method of claim 1, wherein the text analytics include rules based on one of an Unstructured Information Management Architecture (UIMA), an off-the-shelf text analytics suite, and a custom text analytics suite.

4. The method of claim 1, wherein correlating includes computing a correlation score for each change serving as a candidate cause for the incident that indicates a relative likelihood of the occurrence of that change as a cause of the incident.

5. The method of claim 4, further comprising identifying the one or more candidate causes with a highest correlation score as a cause for the incident.

6. The method of claim 1, wherein the time associated with the request includes at least one of a time of the incident, a current time, and a date entered by a requester.

7. The method of claim 1, wherein the index of analyzed data includes one or more of annotations referencing the one or more change records, extensible markup language (XML) representations of the one or more change records, and metadata configured to provide additional change record information.

8. A system for determining a root cause of an incident, said system comprising:
   a computer system including at least one processor configured to:
     analyze one or more change records based on text analytics using a dictionary and rules for the analysis in order to generate an index of analyzed data that represents the one or more change records in an abbreviated representation for searching, wherein the incident pertains to a defect with a manufactured product provided by an entity, and wherein the change records each include a change implemented to operations that produce the manufactured product provided by the entity and a corresponding time frame for occurrence of the change;
     search the index of analyzed data by applying information from a request for the root cause of the incident to the index of analyzed data to determine one or more change records from the abbreviated representation listing changes serving as one or more candidate causes for the incident, wherein applying the information includes:
       correlating the request with the changes listed by the one or more change records based on a time associated with the request being within a specified time interval of the corresponding time frame of occurrence of the changes listed by the one or more change records; and identifying the one or more candidate causes in the one or more change records as causes for the incident based on the correlation.

9. The system of claim 8, wherein the text analytics include dictionaries based on one of an Unstructured Information Management Architecture (UIMA), an off-the-shelf text analytics suite, and a custom text analytics suite.

10. The system of claim 8, wherein the text analytics include rules based on one of an Unstructured Information Management Architecture (UIMA); an off-the-shelf text analytics suite, and a custom text analytics suite.

11. The system of claim 8, wherein correlating includes computing a correlation score for each change serving as a candidate cause for the incident that indicates a relative likelihood of the occurrence of that change as a cause of the incident.

12. The system of claim 11, further comprising identifying the one or more candidate causes with a highest correlation score as a cause for the incident.

13. The system of claim 8, wherein the time associated with the request includes at least one of a time of the incident, a current time, and a date entered by a requester.

14. The system of claim 8, wherein the index of analyzed data includes one or more of annotations referencing the one or more change records, extensible markup language (XML) representations of the one or more change records, and metadata configured to provide additional change record information.

15. A computer program product for determining a root cause of an incident, said computer program product comprising:

a non-transitory computer readable storage medium having computer readable program code embodied therewith, the computer readable program code comprising computer readable program code configured to cause a processor to:

analyze one or more change records based on text analytics using a dictionary and rules for the analysis in order to generate an index of analyzed data that represents the one or more change records in an abbreviated representation for searching, wherein the incident pertains to a defect with a manufactured product provided by an entity, and wherein the change records each include a change implemented to operations that produce the manufactured product provided by the entity and a corresponding time frame for occurrence of the change;

search the index of analyzed data by applying information from a request for the root cause of the incident to the index of analyzed data to determine one or more change records from the abbreviated representation listing changes serving as one or more candidate causes for the incident, wherein applying the information includes;

correlating the request with the changes listed by the one or more change records based on a time associated with the request being within a specified time interval of the corresponding time frame of occurrence of the changes listed by the one or more change records; and identifying the one or more candidate causes in the one or more change records as causes for the incident based on the correlation.

16. The computer program product of claim 15, wherein the text analytics include dictionaries based on one of an Unstructured Information Management Architecture (UIMA), an off-the-shelf text analytics suite, and a custom text analytics suite.

17. The computer program product of claim 15, wherein the text analytics include rules based on one of an Unstructured Information Management Architecture (UIMA), an off-the-shelf text analytics suite, and a custom text analytics suite.

18. The computer program product of claim 15, wherein correlating includes computing a correlation score for each change serving as a candidate cause for the incident that indicates a relative likelihood of the occurrence of that change as a cause of the incident.

19. The computer program product of claim 18, further comprising identifying the one or more candidate causes with a highest correlation score as a cause for the incident.

20. The computer program product of claim 15, wherein the time associated with the request includes at least one of a time of the incident, a current time, and a date entered by a requester.

21. The computer program product of claim 15, wherein the index of analyzed data includes one or more of annotations referencing the one or more change records, extensible markup language (XML) representations of the one or more change records, and metadata configured to provide additional change record information.

* * * * *